Patented June 15, 1943

2,321,890

UNITED STATES PATENT OFFICE 2,321,890

POLYMERIC SULPHONAMIDE

Gerard J. Berchet, Wilmington, Del., assignor to E. I. du Pont de Nemours & Company, Wilmington, Del., a corporation of Delaware No Drawing. Application October 4, 1939, Serial No. 297,963

14 Claims. (Cl. 260—556)

This invention relates to polymeric materials, and more particularly to polymeric sulphonamides.

This invention has as an object the production of new linear polymers. A further object is the manufacture of new compounds and compositions of matter comprising polymeric sulphonamides.

My new polymeric sulphonamides may be obtained by reacting an aliphatic disulphonyl halide with a diamine, which may be either aliphatic or aromatic. As used herein, the term, aliphatic, will include cycloaliphatic.

The disulphonyl halide has the formula Hal.SO$_2$-R-SO$_2$Hal where R is a divalent aliphatic radical containing a chain of at least three atoms, and the diamine has the formula R'HN-R''-NR'H where R' is hydrogen or a monovalent hydrocarbon radical and R'' is a divalent organic radical containing a chain of at least two atoms, both R and R'' being free of substituents reactive with the functional groups, that is, with the sulphonyl or amino groups. In the preferred embodiment of the invention R is a polymethylene chain, R' is hydrogen and R'' is an aliphatic, polymethylenic radical.

The new polymeric sulphonamides are characterized by recurring structural units of the formula

wherein R, R' and R'' are defined as in the next preceding paragraph.

In carrying out the invention the aliphatic disulphonyl halide is reacted, preferably in substantially chemically equivalent amount, with a diamine in which both amino groups are hydrogen-bearing and are the sole amide-forming groups. The diamine may be either aliphatic or aromatic, and the reaction is carried out in a solvent or diluent at temperatures of 0° to 200° C., a hydrogen halide acceptor such as sodium hydroxide or excess diamine being present to remove the hydrogen chloride as formed. The reaction usually is vigorous and ordinarily becomes complete in one to two hours. When a primary amine is used, the polysulphonamide conveniently can be isolated as the alkali salt, which is insoluble in many organic solvents. By subsequent acidification, the salt is converted to the free sulphonamide.

A typical method of preparation is as follows:

One equivalent of the disulphonyl chloride in dioxan solution is added during twenty to thirty minutes to a well-agitated dioxan solution containing two equivalents of the diamine at a temperature of 0° C. Potassium hydroxide, equivalent to the disulphonyl chloride reacted, is added as a five per cent aqueous solution to remove the hydrogen chloride formed in the sulphonation reaction. A second equivalent of the disulphonyl chloride in dioxan is then introduced during an interval of twenty to thirty minutes, followed by addition of sufficient aqueous potassium hydroxide to precipitate the insoluble potassium salt of the polysulphonamide. The polysulphonamide is then obtained upon acidification of this potassium salt.

An alternative procedure is to add two equivalents of diamine to a well-stirred dioxan solution containing one equivalent of disulphonyl halide at a temperature of 30 to 50° C. After one hour, the solvent is removed in a vacuum, and the diamine dihydrohalide is separated from the polysulphonamide by extraction with water.

An essential condition for the success of any of these procedures is that neither reactant contain free acidic groups such as carboxyl or sulphonic acid groups.

The following examples, in which the parts are by weight unless otherwise indicated, are further illustrative of methods for practicing the invention. The first three examples show the preparation of poly-(hexamethylene-para-cyclohexanedisulphonamide).

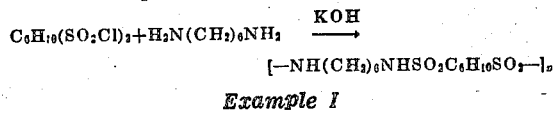

Example I

One half of a solution of para-cyclohexanedisulphonyl chloride (11.26 parts) in 250 parts of purified dioxan is added to a solution of hexamethylenediamine (4.86 parts) dissolved in 3 parts of dioxan at 45° C. Postassium hydroxide (6.68 parts) is added as a 10 per cent aqueous solution followed by the addition of the other half of the disulphonyl chloride at 10° C. A second portion of potassium hydroxide (6.68 parts) as a 10% aqueous solution is added and the white insoluble polymeric potassium salt is removed by filtration. Upon acidification of the potassium salt, a white powder is obtained which melts at 180° C.

This polysulfonamide is soluble in hot phenol or ethylene glycol and can be dissolved in cold formic acid. It is insoluble in most of the other organic solvents, such as alcohol, ether, benzene, chloroform, etc.

*Example II*

In a vessel provided with a stirrer and two graduated separatory funnels is placed 250 parts of a purified dioxan solution containing hexamethylenediamine (4.86 parts). One graduated separatory funnel contains 50 parts of a dioxan solution of para-cyclohexanedisulphonyl chloride (11.76 parts) while the other funnel contains 50 parts of an aqueous solution of potassium hydroxide (6.68 parts). To the vigorously stirred and cooled amine solution (10° C.) are added simultaneously the disulphonyl chloride and potassium hydroxide solutions. By noting the amount of each reagent added through the graduated separatory funnels, it is possible to maintain a slight excess of disulphonyl chloride in the reaction flask. The total addition of the reagents takes 40 minutes and then an additional equivalent (6.68 parts) of potassium hydroxide is added in order to precipitate the potassium salt of the polymeric sulphonamide.

The polymeric potassium salt is titrated with just sufficient acid to liberate the free polysulphonamide. This product is shown to contain both basic (amino) and acidic (sulphonic acid) end groups by titrating the said groups with acid and alkali respectively. These titrations demonstrate that the polymer has an average molecular weight of 1,200.

Poly-(hexamethylene-para-cyclohexanedisulphonamide) is a white powder melting about 180° C.

*Example III*

To 300 parts of an ether solution containing hexamethylene-diamine (9.72 parts, 2 moles) is added the calculated quantity of paracyclohexanedisulphonyl chloride (11.76 parts, 1 mole). A white precipitate is formed at once with considerable evolution of heat. After extraction of the precipitate three times with boiling water, to remove the diamine dihydrochloride, there remains a white solid melting at 180° C. By titrating the end groups of this poly-sulphonamide with acid and alkali, the molecular weight of the polymer is shown to be 1,300.

*Example IV*

Poly-[hexamethylene propanedisulphonamide].

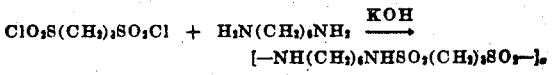

1,3-propanedisulphonyl chloride (16.20 parts) is dissolved in 15 parts of purified dioxan and half of the solution is added to hexamethylene diamine (7.81 parts in 90 parts of dioxan) at 75° C. The slurry is cooled to 10° C. and 7.54 parts of potassium hydroxide as a 10 per cent aqueous solution is added, followed by the balance of the disulphonyl chloride solution. The potassium salt of polysulphonamide precipitates upon further addition of potassium hydroxide (7.54 parts of a 10 per cent aqueous solution). The potassium salt (5.5 parts) is filtered and washed thoroughly with water, in which it is not appreciably soluble.

The polymeric potassium salt is titrated with just sufficient acid to liberate the free polysulphonamide. This polymeric product is then shown to contain basic (amino) and acidic (sulphonic acid) end groups by titration with acid and alkali respectively. These titrations demonstrate that the polymer has an average molecular weight of 1,380. The free polysulphonamide is a white powder melting at 200° C.

The polymeric sulphonamides described herein may also be described in terms of their hydrolysis products. The hydrolysis usually is accomplished by heating a concentrated aqueous hydrochloric acid or hydrobromic acid solution containing the polysulphonamide for three to six hours at temperatures of 180° to 200° C. under a pressure of 700 to 800 lb. gauge. Under these conditions, the polysulphonamides are hydrolyzed to the diamine dihydrohalide, a hydrocarbon and sulphur trioxide, according to the following typical equation:

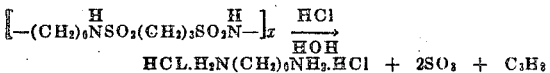

Illustrations of aliphatic disulphonyl halides which may replace those mentioned in the foregoing examples are: decane-1,10-disulphonyl chloride, hexane-1,6-disulphonyl chloride, pentane-1,5-disulphonyl chloride, 2,5-dimethyl hexane-1,6-disulphonyl chloride, 2-tertiary butyl-hexane-1,6-disulphonyl chloride, 2-ethoxybutane-1,4-disulphonyl chloride, and 3-hexene-1,6-disulphonyl chloride. Aliphatic disulphonyl halides containing hetero atoms also can be employed, as for example, 3-oxa-pentane-1,5-disulphonyl chloride ($ClO_2SCH_2CH_2OCH_2CH_2SO_2Cl$), 3-thia-pentane-1,5-disulphonyl chloride, and 3,6-dioxa-octane-1,8-disulphonyl chloride.

In place of the chlorides, the aliphatic sulphonyl fluorides or aliphatic sulphonyl bromides also can be employed. Sulphonyl iodides, however, due to their instability and difficulty of preparation, are less suited for the synthesis of polysulphonamides.

Diamines which can be used in synthesizing polysulphonamides, and in which both amino groups are hydrogen-bearing and are the sole amide-forming groups, include tetramethylenediamine, pentamethylenediamine, hexamethylenediamine, 1,6-diamino-3-hexene decamethylenediamine, paraphenylenediamine, meta-phenylenediamine, benzidine, 1,5-diamine-3-oxa-pentane ($H_2NCH_2CH_2OCH_2CH_2NH_2$), 1,8-diamine-3,6-dioxa-octane

beta, beta-diaminodiethyl sulphide, beta-methyl hexamethylenediamine, and ortho-nitro-paraphenylenediamine. In addition to these diprimary diamines, their N, N'-dialkylated or diarylated derivatives also can be employed. Thus, the N,N'-dimethyl or N,N'-diphenyl derivatives of the above mentioned diprimary diamines are operable. If desired, mixtures of diamines or mixtures of disulphonyl halides may be used to give interpolymers.

In effecting the condensation of any combination of the above mentioned disulphonyl halides and diamines to obtain polysulphonamides and interpolysulphonamides, the choice of a solvent or diluent, or their simultaneous use or omission, and also the duration, temperature, and pressure conditions, as well as the hydrogen halide acceptor, are factors which may be varied considerably. Thus, a solvent, although not necessary, is preferable because it facilitates uniform mixing of the reactants. An appropriate organic solvent also facilitates precipitation of the insoluble salt of the polymeric sulphonamide. The solvent usually is chosen from those solvents which do not react with the starting materials. Thus, dioxan, toluene, xylene, nitrobenzene, or the ethers of ethylene glycol referred to as "Cellosolve"

ethers are examples of solvents that may be employed.

Since one molecule of hydrogen halide is liberated for each sulphonamide group formed, and since the liberated hydrogen halide would immediately react with the diamine needed for further sulphonation, it is necessary to provide for a suitable hydrogen halide acceptor. Convenient acceptors include excess diamine, aqueous sodium or potassium hydroxide, and potassium or sodium carbonates. In place of excess diamine or caustic, N,N-dimethylaniline, N,N-diethylaniline, pyridine or quinoline can be used as acceptors. In addition to functioning as hydrogen halide acceptors, this latter group of reagents also serve as diluents. When aqueous alkali is employed to accept the hydrogen halide formed in the condensation, the preferred temperature range is 0–10° C. to avoid the possibility of hydrolyzing the sulphonyl halide. It is also preferable to regulate the addition of the aqueous alkali so that it is not in excess over the hydrogen halide generated. Temperatures between 0° and 200° C. may be used when excess diamine is employed as the halogen halide acceptor in an inert solvent. Under these conditions, however, it is most convenient to add the disulphonyl halide to the diamine at a rate just sufficient to keep the solvent refluxing.

Since the sulphonation is vigorous, the time for complete reaction is usually only one to two hours. Secondary diamines or branched chain disulphonyl halides usually react more slowly, and complete reaction in these cases may take as long as ten to twelve hours.

Usually, atmospheric pressure is employed because of convenience, although super- and subatmospheric pressures give equally good results. It is also desirable, although not essential, to carry out the reaction in an atmosphere free of acidic, basic or other reactive gases. Thus, the reaction may be carried out in an atmosphere free of carbon dioxide, sulphur dioxide, ammonia, or oxygen. It has been found that deoxidized nitrogen is suitable for blanketing the reaction mixture.

The extent of polymerization can be controlled by employing one of the ingredients in excess, or by the use of certain mono-functional reactants which act as polymerization stabilizers (see British Patent No. 495,790). Stabilizers include mono-primary or mono-secondary amines, such as aniline, butylamine, ethylamine, diethylamine, and N-methyl aniline. Acidic stabilizers such as p-toluenesulphonyl halides, benzenesulphonyl halides, methanesulphonyl halides, and butanesulphonyl halides also may be employed. These stabilizers usually are used in amounts varying from 0.5 to 2.0 mole per cent.

The new polymeric sulphonamides described herein are particularly useful as emulsifying agents, in alkaline solution, as ingredients in molding and coating compositions, and as modifying agents for sulphonamide-formaldehyde resins.

Since many apparently widely different embodiments of this invention may be made without departing from the spirit and scope thereof, it is to be understood that I do not limit myself to the specific embodiments thereof except as defined in the appended claims.

I claim:
1. A polymeric sulphonamide free from carboxylic amide groups and having the recurring structural unit:

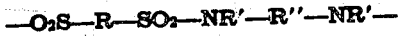

wherein R is a divalent aliphatic polymethylenic hydrocarbon radical separating the two SO₂ groups by a chain containing at least three carbon atoms therein, R' is hydrogen, and R" is a divalent aliphatic polymethylenic hydrocarbon radical separating the amino groups by a chain containing at least two carbon atoms therein.

2. A polymeric sulphonamide free from carboxylic amide groups and having the recurring structural unit:

wherein R is a divalent aliphatic radical separating the two SO₂ groups by a chain containing at least three carbon atoms in said chain, each of said two SO₂ groups being directly connected to carbon in said chain, R' is a member of the group consisting of hydrogen and monovalent hydrocarbon radicals, and R" is a divalent organic radical separating the amino groups by a chain containing at least two carbon atoms in said chain, each of said two amino groups being directly connected to carbon in said chain, R being connected to two and only two SO₂ groups and R" being connected to two and only two amino groups as the sole groups reactive with sulphonyl halide and amino groups.

3. A process for the production of polymeric sulphonamides which comprises reacting together an aliphatic disulphonyl halide containing two and only two sulphonyl halide groups as the sole reacting groups and a diamine containing two and only two amino groups as the sole reacting groups, the two sulphonyl groups of said aliphatic disulphonyl halide being separated by a chain containing at least three carbon atoms in said chain and being directly connected to carbon therein, the two amino groups of said diamine being separated by a chain containing at least two carbon atoms in said chain and being directly connected to carbon therein, and each of the amino nitrogen atoms of said diamine being hydrogen-bearing and attached only to hydrogen and carbon atoms.

4. The process set forth in claim 9 in which the disulphonyl halide is para-cyclohexanedisulphonyl chloride and the diamine is hexamethylenediamine.

5. The process set forth in claim 9 in which the disulphonyl halide is 1,3-propanedisulphonyl chloride and the diamine is hexamethylenediamine.

6. A polymeric sulphonamide consisting of the recurring structural unit:

wherein R is an alkylene radical containing a chain length of at least three carbon atoms between the SO₂ groups, R" is a hydrocarbon radical having a chain length of at least two carbon atoms, and R' is a member of the group consisting of hydrogen and monovalent hydrocarbon radicals.

7. A process for the production of polymeric sulphonamides consisting of the recurring structural unit:

which comprises reacting together, in the presence of a hydrogen halide acceptor, an alkylene disulphonyl halide of the formula XO₂S—R—SO₂X with a diamine of the formula HNR'—R"—HNR'; wherein X is a halogen, R is an alkylene radical having a chain length of at least three carbon atoms between the SO₂ groups, R" is a hydrocarbon radical having a chain length of at least two carbon atoms, and R' is a member of the group consisting of hydrogen and monovalent hydrocarbon radicals.

8. A polymeric sulphonamide consisting of the recurring structural unit:

—O₂S—R—SO₂—NH—R''—NH— wherein R is an alkylene radical containing a chain length of at least three carbon atoms between the SO₂ groups, and R'' is a member of the group consisting of arylene radicals, and alkylene radicals containing at least four carbon atoms.

9. A process for the production of polymeric sulphonamides consisting of the recurring structural unit:

—O₂S—R—SO₂—NH—R''—NH— which comprises reacting together, in the presence of a hydrogen halide acceptor, an alkylene disulphonyl halide of the formula

XO₂S—R—SO₂X with a diamine of the formula H₂N—R''NH₂; wherein X is a halogen, R is an alkylene radical having a chain length of at least three carbon atoms between the SO₂ groups, and R'' is a member of the group consisting of arylene radicals, and alkylene radicals containing at least four carbon atoms.

10. Poly-hexamethylene-para - cyclohexanedisulphonamide.

11. Poly - hexamethylene propanedisulphonamide.

12. The polymeric sulphonamide set forth in claim 2 where R'' is a divalent aliphatic hydrocarbon radical.

13. The process which comprises reacting together in the presence of a hydrogen halide acceptor, the aliphatic disulphonyl halide and diamine set forth in claim 3.

14. The process which comprises reacting together in the presence of a hydrogen halide acceptor the aliphatic disulphonyl halide and diamine set forth in claim 3, where the disulphonyl halide is a disulphonyl chloride.

GERARD J. BERCHET.